United States Patent [19]
Sugimoto et al.

[11] Patent Number: 5,702,998
[45] Date of Patent: Dec. 30, 1997

[54] SINTERED CERAMIC BODY FOR A SPARK PLUG INSULATOR AND METHOD OF SINTERING THE SAME

[75] Inventors: Makoto Sugimoto; Mamoru Musasa; Hiroyuki Tanabe; Masahiro Konishi, all of Nagoya, Japan

[73] Assignee: NGK Spark Plug Co., Ltd., Nagoya, Japan

[21] Appl. No.: 285,832

[22] Filed: Aug. 4, 1994

Related U.S. Application Data

[62] Division of Ser. No. 31,931, Mar. 15, 1993, Pat. No. 5,370,832, which is a continuation of Ser. No. 781,118, Oct. 22, 1991, abandoned.

[30] Foreign Application Priority Data

Oct. 22, 1990 [JP] Japan ................................ 2-285427

[51] Int. Cl.[6] ..................... C04B 35/581; C04B 35/584
[52] U.S. Cl. ..................... 501/97; 501/96; 501/98
[58] Field of Search ..................... 501/96, 97, 98

[56] References Cited

U.S. PATENT DOCUMENTS

| | | | |
|---|---|---|---|
| 4,845,059 | 7/1989 | Kohtoku et al. | 501/98 |
| 4,912,305 | 3/1990 | Tatemasu et al. | 501/97 |
| 5,032,553 | 7/1991 | Tarry | 501/98 |

*Primary Examiner*—Michael Marcheschi
*Attorney, Agent, or Firm*—Donald S. Dowden

[57] ABSTRACT

In a spark plug insulator having a sintered ceramic body, the ceramic body has silicon nitride ($Si_3N_4$), aluminum nitride (AlN) and alumina ($Al_2O_3$), the sum of the weight of aluminum nitride (AlN) and alumina ($Al_2O_3$) to silicon nitride ($Si_3N_4$) is in the range of 0.093–1.439. Typically, the additive is represented by the group consisting of yttrium oxide ($Y_2O_3$), calcium oxide (CaO), lanthanum oxide ($La_2O_3$), magnesia (MgO), cerium oxide (SrO), barium oxide (BaO) and neodymium ($Nd_2O_3$). The percentage by weight of the sintering additive ranges from 0.3% to 15.0% of the total weight of the silicon nitride ($Si_3N_4$), aluminum nitride (AlN) and alumina ($Al_2O_3$).

1 Claim, 2 Drawing Sheets

SINTERED CERAMIC BODY FOR A SPARK PLUG INSULATOR AND METHOD OF SINTERING THE SAME

This is a Division of application Ser. No. 08/031,931 filed Mar. 15, 1993 U.S. Pat. No. 5,370,832 which, in turn, is a Continuation of Ser. No. 07/781,118 filed Oct. 22, 1991, now abandoned.

BACKGROUND OF THE INVENTION

1. Field of the Invention

This invention relates to a sintered ceramic body well-suited for a spark plug insulator which needs an elevated insulation property at high ambient temperature with good thermal conductivity.

2. Description of Prior Art

In a spark plug insulator for an internal combustion engine, a oxinite sintered ceramic body has been employed since the sintered ceramic body has good thermal conductivity.

The oxinite sintered ceramic body, however, comes to decrease its electrical insulation when exposed to high ambient temperature, and grows crystals treeing over the surface of the sintered ceramic body when high voltage is applied.

Therefore, it is an object of the invention to provide a sintered ceramic body and spark plug insulator which are capable of maintaining an elevated insulation property at high ambient temperature with good thermal conductivity.

SUMMARY OF THE INVENTION

According to the invention, there is provided a sintered ceramic body for a spark plug insulator comprising silicon nitride ($Si_3N_4$), aluminum nitride (AlN) and alumina ($Al_2O_3$), reduced weight percentage of the silicon nitride ($Si_3N_4$), aluminum nitride (AlN) and alumina ($Al_2O_3$) in the sintered ceramic body falling within an area surrounded by points A (91.5, 1.5, 7.0), B (91.5, 2.5, 6.0), C (91.5, 3.5, 5.0), F (83.0, 7.0, 10.0), J (66.0, 14.0, 20.0), O (50.0, 20.5, 29.0), T (41.0, 24.0, 35.0), S (41.0, 17.0, 42.0), R (41.0, 10.0, 49.0), M (50.0, 8.5, 41.5), H (66.0, 6.0, 28.0), D (83.0, 3.0, 14.0) and A (91.5, 1.5, 7.0) at a three-component diagram in which numerals in parentheses indicate the reduced weight percentage of the silicon nitride ($Si_3N_4$), aluminum nitride (AlN) and alumina ($Al_2O_3$) respectively; and at least one sintering additive selected from the group consisting yttrium oxide ($Y_2O_3$), calcium oxide (CaO), lanthanum oxide ($La_2O_3$), magnesia (MgO), cerium oxide ($CeO_2$), scandium oxide ($Sc_2O_3$), strontium oxide (SrO), barium oxide (BaO) and neodymium ($Nd_2O_3$), weight percentage of the sintering additive ranging from 0.3% to 15.0% of the total weight of the silicon nitride ($Si_3N_4$), aluminum nitride (AlN) and alumina ($Al_2O_3$).

Since an oxinite sintered ceramic is chemically structured by a strong covalent bondage, free electrons cause to represent electrical conductivity. An increased ambient temperature facilitates the movement of the free electrons to decrease an electrical resistance so as to reduce an insulation property of the sintered body.

The reduced weight percentage of the silicon nitride ($Si_3N_4$), aluminum nitride (AlN) and alumina ($Al_2O_3$) is such that the ceramic sintered body is in the form of β-sialon ($Si_mAl_nN_xO_y$), a substitutional solid solution in which (Si) of $Si_3N_4$ is partly replaced by (Al), while (N) of $Si_3N_4$ partly replaced by (O). The β-sialon is characterized by ion bondage, and has a chemical property similar to alumina ($Al_2O_3$) which substantially maintains an uniform electrical resistance under high temperature.

The sintering additive of less than 0.3 weight percent brings an adverse affect on the sintering to decrease a density of the sintered body, and imparting a liquid-absorbing property. The sintering additive exceeding 15 weight percent forms vitrified phase on a granular boundary of the sintered body so as to significantly deteriorate its strength.

With the oxinite ceramic body employed to the spark plug insulator, there is provided a spark plug which is capable of imparting anti-fouling and heat-resistant property by maintaining an elevated insulation property and good thermal conductivity at high ambient temperature.

These and other objects and advantages of the invention will be apparent upon reference to the following specification, attendant claims and drawings.

DETAILED DESCRIPTION OF THE EMBODIMENTS

Figure 1:
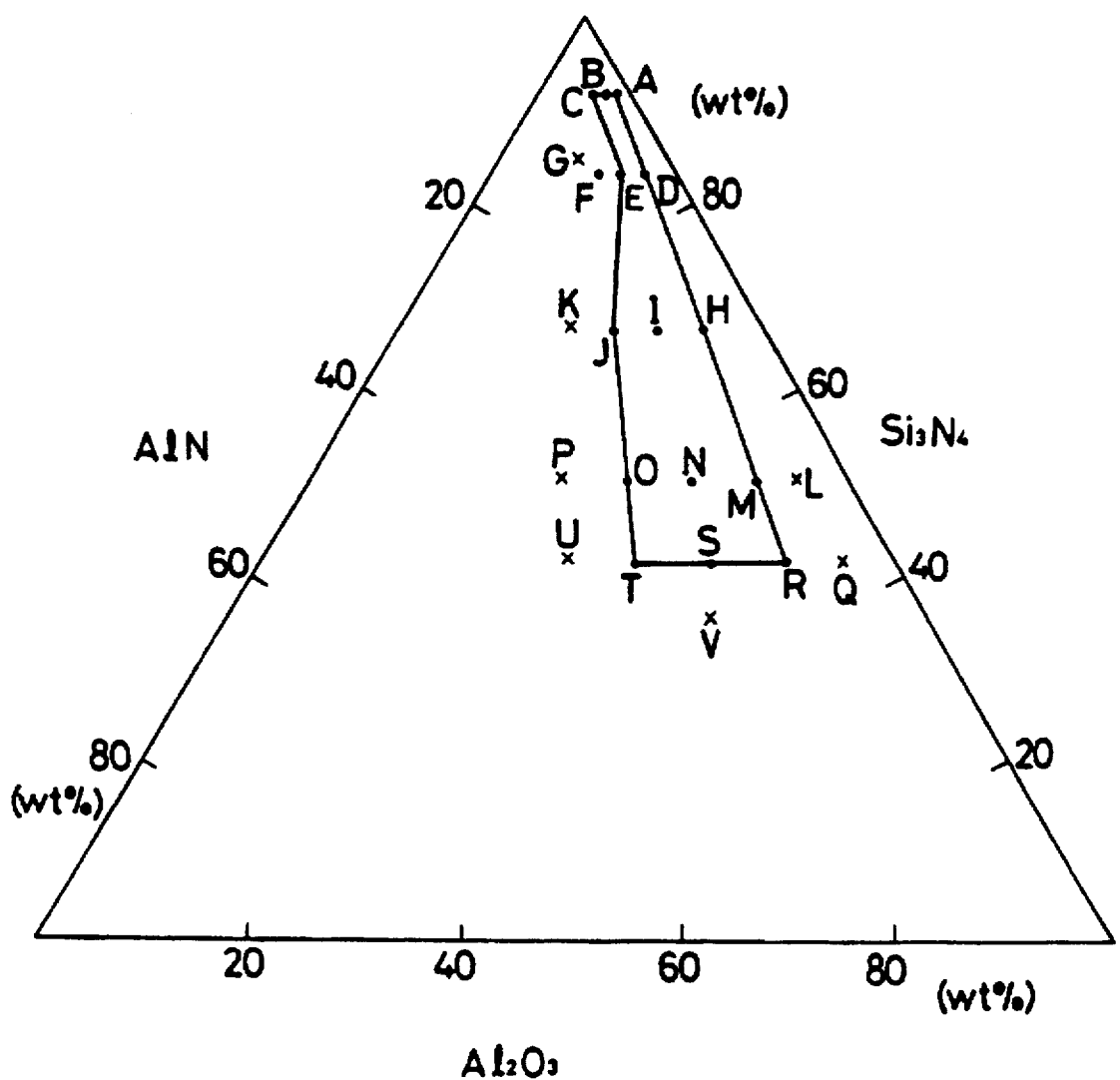
FIG. 1 is a three-component diagram of silicon nitride ($Si_3N_4$), aluminum nitride (AlN) and alumina ($Al_2O_3$) depicted to show each weight-percentage area which keeps an electrical resistance of a sintered ceramic body 50 M/Ω or more at 700° C.
Figure 2:
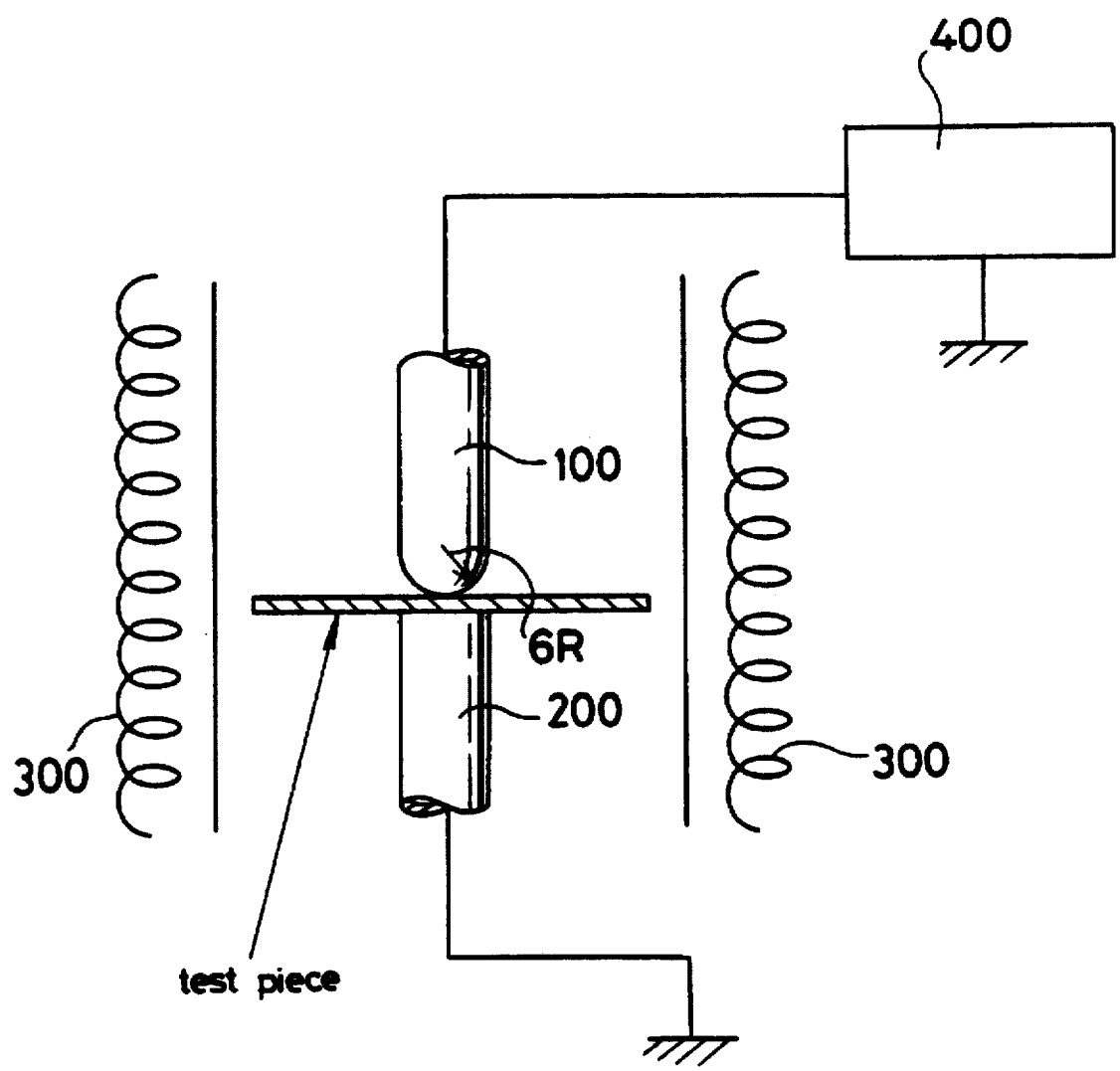
FIG. 2 is a schematic plan view showing a device to measure insulation resistance of test pieces at high temperature.

Referring to FIGS. 1, 2 and Table 1, an experiment is carried out in order to seek a weight-percentage area of a sintered body including silicon nitride ($Si_3N_4$), aluminum nitride (AlN) and alumina ($Al_2O_3$) which keeps its electrical resistance 50 M/Ω or more at 700° C. The reference notations (A)–(V) in FIG. 1 corresponds to those of test pieces in Table 1.

(1) Silicon nitride ($Si_3N_4$) powder is prepared whose granular size measures 1.5 μm in average diameter (sedimentation analysis) with an oxygen-laden rate as 1.0 weight percent. Aluminum nitride (AlN), alumina ($Al_2O_3$) and yttrium oxide ($Y_2O_3$) powder are added to the silicon nitride ($Si_3N_4$) powder to form a mixture. Size of the aluminum nitride powder measures 1.0 μm in average diameter (sedimentation analysis) with an oxygen-laden rate as 1.0 weight percent, while size of the alumina powder measures 1.0 μm in average diameter. Test pieces hereinafter obtained are prepared by previously adopting each amount of ($Si_3N_4$), ($Al_2O_3$) and (AlN) substantially according to Table 1 depicted hereinafter.

Each of sintering additives employed herein is 99.9% purity with ratio of surface area to weight as 12 m²/g. The sintering additive is selected alone or combination from the group consisting of yttrium oxide ($Y_2O_3$), calcium oxide (CaO), lanthanum oxide ($La_2O_3$), magnesia (MgO), cerium oxide ($CeO_2$), scandium oxide ($Sc_2O_3$), strontium oxide (SrO), barium oxide (BaO) and neodymium ($Nd_2O_3$).

An ethanol or wax-related binder is added to the mixture of the aluminum nitride, alumina, silicon nitride and yttrium oxide powder, and are kneaded within a nylon pot by means of a ball for approximately 24 hours. A quantity of the silicon nitride ($Si_3N_4$) and yttrium oxide ($Y_2O_3$) powder is determined by taking the fact into consideration that 20–30% of (Si) and (Y) disappear during a sintering process described hereinafter.

(2) After spray drying a slurry produced by kneading the mixture, the mixture is formed into a compact plate which measures 50 mm in diameter and 3.0 mm in thickness. Then the compact plate is primarily sintered at about 500° C., and pressed under 2 tons/cm² pressure by means of cold isostatic press (CIP).

(3) The compact plate is placed in a shell which is made of boron nitride (BN), and is secondarily sintered for 2~5 hours at temperature of 1650° C.~1750° C., while circulating nitrogen gas circulating within the shell according to sintering conditions shown in Table 1.

(4) The compact plate thus secondarily sintered (sintered body) is milled to measure 40 mm in diameter and 1.0 mm in thickness to provide test pieces (A)~(V). Each weight percentage of the silicon nitride ($Si_3N_4$), aluminum nitride (AlN), alumina ($Al_2O_3$) and yttrium oxide ($Y_2O_3$) is measured on the basis of fluorescent-sensitive X-ray detection.

In this instance, each weight percentage of the silicon nitride ($Si_3N_4$), aluminum nitride (AlN) and alumina ($Al_2O_3$) is reduced from the sintered body as is referred to as reduced weight percentage hereinafter.

Each insulation resistance of ($Si_3N_4$), (AlN), ($Al_2O_3$) and ($Y_2O_3$) is measured at 700° C. by using a device shown in FIG. 2 which has brass-made electrodes 100, 200, a heater 300 and a 500-volt digital resistance meter 400.

As a result of the experiment (4), it is found from Table 1 that test pieces (A)~(F), (H)~(J), (M)~(O) and (R)~(T) represent their insulation resistance of 50 M/Ω or more at 700° C.

An experiment is carried out to determine reduced weight-percentage area of the sintering additive which enables densely sintered body so as to sufficiently resist against fracture.

TABLE 1

| test piece | reduced weight percentage of $Si_3N_4$ (wt %) | reduced weight percentage of AlN (wt %) | reduced weight percentage of $A_2O_3$ (wt %) | sintering conditions (°C. × Hr) | insulation resistance at 700° C. (MΩ) |
|---|---|---|---|---|---|
| A | 91.5 | 1.5 | 7.0 | 1750 × 2 | 85 |
| B | 91.5 | 2.5 | 6.0 | 1750 × 2 | 100 |
| C | 91.5 | 3.5 | 5.0 | 1750 × 2 | 90 |
| D | 83.0 | 3.0 | 14.0 | 1700 × 2 | 110 |
| E | 83.0 | 5.0 | 12.0 | 1700 × 2 | 120 |
| F | 83.0 | 7.0 | 10.0 | 1700 × 5 | 70 |
| G | 83.0 | 9.0 | 8.0 | 1700 × 5 | 30* |
| H | 66.0 | 6.0 | 28.0 | 1700 × 2 | 150 |
| I | 66.0 | 10.0 | 24.0 | 1700 × 2 | 180 |
| J | 66.0 | 14.0 | 20.0 | 1700 × 2 | 200 |
| K | 66.0 | 18.0 | 16.0 | 1700 × 2 | 20* |
| L | 50.0 | 5.0 | 45.0 | 1700 × 2 | 15* |
| M | 50.0 | 8.5 | 41.5 | 1650 × 2 | 120 |
| N | 50.0 | 14.5 | 35.5 | 1650 × 2 | 120 |
| O | 50.0 | 20.5 | 29.0 | 1650 × 2 | 65 |
| P | 50.0 | 26.5 | 22.5 | 1650 × 2 | 20* |
| Q | 41.0 | 5.0 | 54.0 | 1650 × 2 | 25* |
| R | 41.0 | 10.0 | 49.0 | 1650 × 2 | 500 |
| S | 41.0 | 17.0 | 42.0 | 1650 × 2 | 320 |
| T | 41.0 | 24.0 | 35.0 | 1650 × 2 | 190 |
| U | 41.0 | 31.0 | 28.0 | 1700 × 2 | 30* |
| V | 35.0 | 20.0 | 45.0 | 1650 × 2 | 45* |

Auxiliary agent used at above test pieces is $Y_2O_3$ weight percentage of which is 5 wt % of the total weight of $Si_3N_4$, AlN and $Al_2O_3$.
test pieces A-F, H-J, M-O, R-T: according to the invention.
Counterpart test pieces: G, K, L, P, Q, U, V (vulnerable to treeing due to low insulation resistance at 700° C. as indicated by asterisk *).

The slurry spray dried in the same manner as item (1) is formed into two shape of a disk and plate. The disk measures 50 mm in diameter and 3.0 mm in thickness, while the plate measures 10 mm×40 mm, and 5.0 mm in thickness. The disk and plate are primarily sintered in the same manner as item (1), and placed in a shell which is made of boron nitride (BN) employed for its high refractory. Then the disk and plate are secondarily sintered for 2~5 hours at temperature of 1550° C.~1750° C., while circulating nitrogen gas circulating within the shell according to sintering conditions shown in Table 2. The disk is milled to measure 40 mm in diameter and 1.0 mm in thickness, while the plate is milled to measure 8 mm×30 mm and 4.0 mm in thickness to provide test pieces.

By using these test pieces, reduced weight percentage of the sintering additive is measured on the basis of fluorescent-sensitive X-ray detection, while each relative density of the test pieces is calculated by comparing theoretical density with apparent density measured by Archimedes' method. Three-point bending test according to JIS C4104 is used to measure resistant strength of the test pieces against fracture in addition to each reduced weight percentage of ($Si_3N_4$), (AlN), ($Al_2O_3$) and insulation resistance of the test pieces.

As a result, it is found from Table 2 that the test pieces (a)~(h) have high relative density, high resistant strength against fracture and insulation resistance of 50 M/Ω or more. Reduced weight percentage of these test pieces (a)~(h) ranges from 0.3 wt % to 15 wt of the total weight of ($Si_3N_4$), (AlN) and ($Al_2O_3$).

aluminum nitride (AlN) and alumina ($Al_2O_3$) to silicon nitride ($Si_3N_4$) is in the range of 0.093–1.439.

Therefore, it is necessary to arrange that the reduced weight percentage of the silicon nitride ranging from 41.0% to 91.5%, while reduced weight percentage of the aluminum nitride ranging from 2.5% to 24.0%, and the reduced weight percentage of the alumina ranging from 5.7% to 49.0% so as to maintain an electrical resistance of a sintered ceramic body 50 M/Ω or more at 700° C.

A spark plug insulator is made in accordance with the test pieces (a)~(h). After a center electrode, a resistor and a terminal electrode are placed within an axial bore of the insulator through an electrically conductive glass sealant, the insulator is placed within a metallic shell to form a spark plug which is found to ensure anti-fouling and heat-resistant property so as to prevent misfire.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

1. A sintered ceramic spark plug insulator body consisting essentially of silicon nitride ($Si_3N_4$), aluminum nitride (AlN) and alumina ($Al_2O_3$), the ratio of the sum of the

TABLE 2

| test piece | reduced weight percentage of $Si_3N_4$ (wt %) | reduced weight percentage of AlN (wt %) | reduced weight percentage of $A_2O_3$ (wt %) | weight percentage of sintering additive (wt %) | | sintering conditions (°C. × Hr) | relative density (%) | resistant strength against fracture (kg/mm²) |
|---|---|---|---|---|---|---|---|---|
| a | 91.5 | 2.5 | 6.0 | $Y_2O_3$ | 10 | 1650 × 2 | 99 | 52 |
| b | 83.0 | 7.0 | 10.0 | $Y_2O_3$ | 15 | 1650 × 2 | 99 | 45 |
| c | 83.0 | 7.0 | 10.0 | CaO | 3 | 1650 × 2 | 99 | 42 |
| d | 50.0 | 14.5 | 35.5 | MgO | 2 | 1600 × 2 | 98 | 24 |
| e | 41.0 | 17.0 | 42.0 | $CeO_2$ | 7 | 1700 × 2 | 99 | 22 |
| f | 41.0 | 17.0 | 42.0 | $Y_2O_3$ | 5 | 1650 × 2 | 99 | 26 |
| g | 83.0 | 6.5 | 9.5 | $Y_2O_3$ | 0.3 | 1750 × 2 | 99 | 32 |
| h | 90.0 | 3.0 | 7.0 | $CeO_2$ | 0.5 | 1700 × 2 | 99 | 51 |
| i | 83.0 | 5.0 | 12.0 | $CeO_2$ | 0.1 | 1750 × 2 | 92* | not measured |
| J | 83.0 | 5.0 | 12.0 | $CeO_2$ | 0.2 | 1750 × 2 | 93* | not measured |
| k | 66.0 | 6.0 | 28.0 | $CeO_2$ | 0.15 | 1750 × 2 | 91* | not measured |
| l | 66.0 | 6.0 | 28.0 | $CeO_2$ | 18 | 1550 × 2 | 99 | 16** |
| m | 66.0 | 6.0 | 28.0 | $CeO_2$ | 21 | 1600 × 2 | 99 | 18** | insulation resistance: 50 MΩ or more for all the test pieces
test pieces (a)~(h): accoreing to the invention
test pieces (i)~(m): counterpart specimens
(*): representing liquid-absorbing property due to low relative density and low resistant strength against fracture.
(**): representing very low resistant strength against fracture.

These the test piece (a)~(h) have good insulation resistance and favorable thermal conductivity at the temperature of 700° C., thus making the sintered body well-suited for a spark plug insulator since the spark plug insulator needs the thermal conductivity of more than 90 W/m and the insulation resistance of more than 50 M/Ω at 700° C. from treeing-preventing viewpoint.

Reduced weight percentage of ($Si_3N_4$), (AlN) and ($Al_2O_3$) of these test pieces (a)~(h) falls within an area surrounded by points A (91.5, 1.5, 7.0), B (91.5, 2.5, 6.0), C (91.5, 3.5, 5.0), F (83.0, 7.0, 10.0), J (66.0, 14.0, 20.0), O (50.0, 20.5, 29.0), T (41.0, 24.0, 35.0), S (41.0, 17.0, 42.0), R (41.0, 10.0, 49.0), M (50.0, 8.5, 41.5), H (66.0, 6.0, 28.0), D (83.0, 3.0, 14.0) and A (91.5, 1.5, 7.0) at three-component diagram shown in FIG. 1. Numerals in the parentheses indicate reduced weight percentage of silicon nitride ($Si_3N_4$), aluminum nitride (AlN) and alumina ($Al_2O_3$) in turn, in this instance, the ratio of the sum of the weight of aluminum nitride (AlN) and alumina ($Al_2O_3$) to silicon nitride ($Si_3N_4$) being in the range 0.093–1.439 and at least one sintering additive selected from the group consisting of yttrium oxide ($Y_2O_3$), calcium oxide (CaO), lanthanum oxide ($La_2O_3$), magnesia (MgO), cerium oxide ($CeO_2$), scandium oxide ($Sc_2O_3$), strontium oxide (SrO), barium oxide (BaO) and neodymium ($Nd_2O_3$), the weight percentage of the sintering additive being in the range from 0.3 to 15.0 of the total weight of the silicon nitride ($Si_3N_4$), aluminum nitride (AlN) and alumina ($Al_2O_3$), said sintered ceramic body having an electrical resistance of 50 M/Ω or more at 700° C., the composition of said spark plug insulator body being within the area bounded by the straight lines connected points A, C, E, J, T, R and A shown in the three-component or triaxial diagram of FIG. 1, said three component diagram being made up of the compounds ($Si_3N_4$), aluminum nitride (AlN) and alumina ($Al_2O_3$).

* * * * *